Patented Dec. 13, 1949

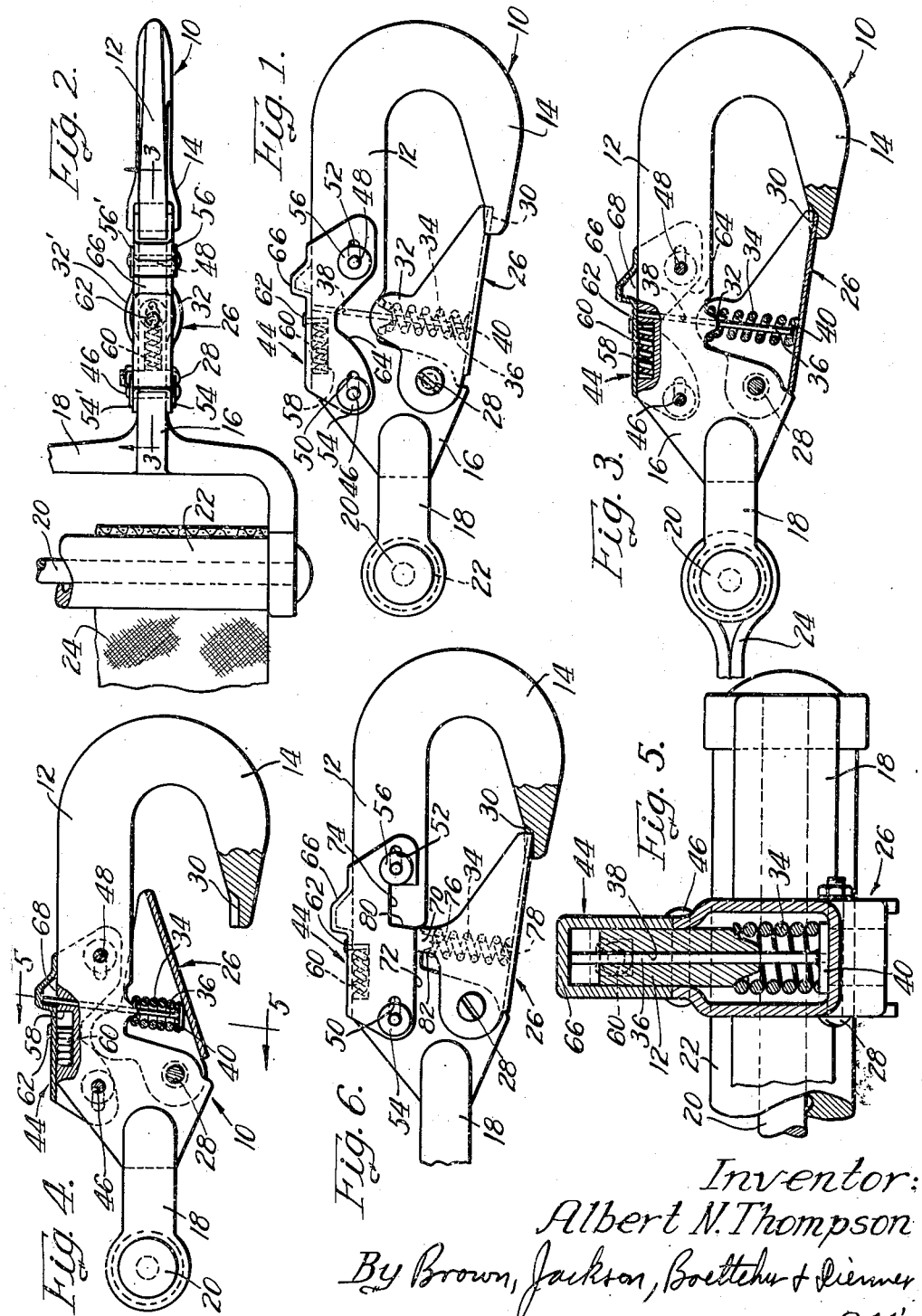

2,490,931

UNITED STATES PATENT OFFICE 2,490,931

SELF-LOCKING DEVICE FOR LINE-MEN'S BODY BELTS

Albert N. Thompson, Chicago, Ill.

Application March 12, 1947, Serial No. 734,157

3 Claims. (Cl. 24—241)

My invention relates to snap hooks and more particularly to a safety snap hook which will not accidentally open, but which may be readily opened, when desired, by one hand of the user.

Although the safety snap hook of my invention has a multitude of uses, it is particularly well adapted for use by any person who is required to work at a distance above the ground, for example, a lineman for a telephone, telegraph or electric light and power company, the hook being fastened to a supporting belt or strap which, in turn, is connectible, by said hook, to a body belt worn by the lineman. The supporting belt or strap may, for example, encircle a pole or a girder.

The lineman normally finds support for his feet on spikes or blocks, for example, on the side of the pole, and finds support to prevent his falling backwardly or sidewardly by reason of the body belt which he wears, which belt is connected by a snap hook to the belt or strap encircling the pole. By supporting himself in this fashion the lineman has free use of both hands to perform his work. In such an arrangement, the snap hook may be carried by the supporting strap which encircles the pole, and one or more D-rings for selective connection therewith may be fastened to the body belt. Alternatively, the hook may be on the body belt, while the D-ring is carried on the strap or belt encircling the pole.

Many forms of safety snap hook have been proposed for the use mentioned above, and for other uses, but, to my knowledge, none has been proposed which provides adequate locking or safety means for the hook, while yet permitting the hook to be readily releasable by one hand of the user. It is an object of my invention to provide a safety hook of such construction that when the lineman purposely intends to release the hook from the object to which it is connected, he can do so easily and merely by using the thumb and a finger of one hand.

Certain forms of safety snap hooks presently in use have a locking member which must be moved before the spring latch of the hook can be released. However, some of these locking members are so formed that they may be moved accidentally to unlocking position when the lineman presses the safety hook between his body and some other object, such as a telephone pole.

It is an object of my invention to provide locking means which can be opened only by movement of a locking member in one direction and by movement of the latch of the safety hook in a direction crosswise thereto. By such construction, pressure exerted on the hook when the hook is pressed between the lineman's body and some other object will not cause an inadvertent opening of the latch and a release of the hook from the object to which it is secured. This results in much greater safety for the lineman.

In order that the hook may be quickly released, the locking elements of my invention are so arranged that a normal cooperating movement of the thumb and a finger, such as the index finger, of the lineman's hand acting against the latch and the locking member will promptly provide the necessary crosswise movement of the locking means and latch with a minimum of effort. Release from the grip of the finger and thumb immediately and automatically returns the locking mechanism and the latch to their locking or closed positions.

It is a further object of my invention to provide a safety snap hook which contains few elements, said elements being inexpensive and simple, whereby the manufacturing cost of the hook is reduced. Such hook, however, is sturdy, and will stand a maximum of abuse under severe operating conditions.

It is a further object to provide safety or locking mechanism in a safety snap hook, such that no element thereof will have a tendency to cut or tear the clothing of the workman, or the covering for his hands.

Other objects, uses and advantages of my invention will become apparent from the following description when taken with the drawings, in which—

Figure 1 is an elevational view of the safety snap hook of my invention;

Figure 2 is a plan view of the hook of Figure 1;

Figure 3 is a view, partially in section, taken on the line 3—3 of Figure 2, of the safety snap hook showing the latch and locking means in closed position;

Figure 4 is a view similar to that of Figure 3, but showing the latch in open or unlocked position;

Figure 5 is a sectional view, on enlarged scale, taken on the line 5—5 of Figure 4;

Figure 6 is a side elevational view of a modification of the safety snap hook of Figure 1.

The same reference numerals have been employed in the several views to indicate the same or similar elements.

Referring now to Figures 1–5 of the drawings, the safety snap hook is indicated generally by the reference numeral 10 and comprises a shank 12 and bill 14. At the end 16 of the hook 10 there is a clevis 18 between the arms of which is carried a pin 20 which may have a cylindrical bearing 22. The reference numeral 24 indicates generally a portion of the strap or belt which encircles a pole. It will be understood, of course, that the belt 24 could, instead, be the body belt worn by the lineman. Belt 24 is secured about the cylindrical bearing 22 and pin 20.

A latch, indicated generally by the reference numeral 26, is formed of sheet metal stamped so as to have a generally U-shaped cross-section, which latch is pivoted at one end to the end 16 of the hook 10 by means of a rivet or by a machine screw 28, as shown, which passes through the shank of the hook. The other end of the latch 26, when in its closed position, engages a seat 30 formed in the end of the bill 14. Flanges 32 and 32' of the latch 26, by passing along opposite sides of the shank 12, serve to guide the movement of the latch when it pivots about the screw 28. A coil spring 34 is interposed between the inner side of the shank 12 of hook 10, and the inner side of the latch 26 and urges said latch into closed position whereby its free end is normally positioned within the seat 30 of the bill 14. Spring 34 is maintained in position by a blocking pin 36 which passes through the center of spring 34 and is carried in a passageway 38 in the shank 12 of hook 10. At the lower end of pin 36 there is secured a washer 40 against which the spring 34 presses, so that pin 36 will always be directed toward the latch 26. The length of pin 36 is such as to extend from the inner side of latch 26, when the latch is in its closed position, to the outer surface of the shank 12, as shown.

A slide, indicated generally by the reference numeral 44, is formed of a piece of sheet metal, having a generally U-shape cross section, which fits over the shank 12 of hook 10 and has longitudinal movement along said shank within the limits determined by the pins 46 and 48 which fit within slots 50 and 52, respectively, in the slide 44. The pins 46 and 48 are carried by the shank 12 of the hook 10 and are retained in position by washers or heads 54 and 54' on pin 46 and heads 56 and 56' on pin 48. A slot 58 is milled out on the outer surface of the shank 12 to a depth and width equal to the diameter of a coil spring 60 which fits therein. The slide 44 covers the slot 58 and spring 60 and carries a projection in the form of a pin 62 which extends into slot 58 and bears against the spring 60. Consequently, spring 60 urges the slide 44 longitudinally of the shank 12 in a direction away from end 16 of the hook 10. It will be noted that the side walls of slide 44 are recessed, as at 64, in order that flanges 32 of the latch 26 will not be obstructed in their movement when the latch is opened in the manner described hereinafter.

It will be further noted that the slide 44 has a struck-up portion 66 which provides a gate or opening 68 for the passage of blocking pin 36 when the slide 44 is retracted against the action of spring 60. It will be appreciated that in place of the struck-up portion 66 merely an aperture might be supplied in the mid portion of slide 44 which aperture, like the struck-up portion 66, normally would not be aligned with pin 36, but might be moved from its normal blocking position to an unblocking position by retraction of the slide against the action of spring 60, so that the blocking pin 36 might pass through said aperture, and thereby permit movement of the latch 26 to open position.

Assuming, for example, that a lineman is wearing a body belt having a D-ring and desires to connect said D-ring with a hook, such as hook 10, on a belt or strap encircling a pole, he will grip the hook 10 with one hand, placing the thumb, for example, on the latch 26 and his index finger on the struck-up portion 66 of the slide 44 and will, by a natural and easy movement, retract the slide 44 against the action of spring 60 by his index finger, thereby aligning pin 36 with the gate 68 in the slide 44, and will then press the latch 26 toward the shank 12 of hook 10 by his thumb, to move the latch to open position whereby the point of the bill 14 may be passed through the D-ring on the body belt. The movements of the slide and the latch take place almost simultaneously, and are readily performed because the action of moving the thumb and index finger toward each other provides a component of force from the index finger in a direction which retracts the slide 44. As soon as the slide is retracted the proper amount, continued pressure on the latch by the thumb moves it and the blocking pin 36 in a direction toward the shank 12 and the slide 44. Alternatively, the latch 26 may be opened by pressing the finger against it while pressing the thumb against the struck-up portion 66 on the slide.

The moment that the latch or the latch and the slide together have pressure removed therefrom, they will immediately and automatically return to locking position wherein the latch 26 seats against the bill 14 of hook 10 and the slide 44 blocks movement of the pin 36. Since the direction of movement of latch 26 is crosswise with respect to movement of slide 44, pressing the hook between two objects, such as the body of the line man and a telephone pole, will not cause an inadvertent opening of the latch. To open the latch it is necessary first to move the slide longitudinally of the shank 12 and then to move the latch transversely with respect to said shank.

The struck-up portion 66 of slide 44 serves not only to provide means against which the finger of the lineman may press to move said slide, but also serves as a housing for the protruding end of the pin 36 when said pin passes through the gate 68 in slide 44. Although such a housing for the end of the pin is not absolutely necessary, it is preferred, since otherwise the pin might have a tendency to tear the gloves of the lineman which serve to insulate him from electrical fixtures with which he is working.

In Figure 6 is shown a modified form of my invention wherein the pin 36 is omitted, and the blocking element is provided in the form of projections 70 on the side walls of the latch 26. With the slide 44 in its locking position, the projections 70 abut against the edges 72 of the slide, and thereby prevent opening of the latch 26. When the slide 44 is retracted against the action of its spring 60, notches 74 in the sides of the slide 44 align themselves with the projections 70 and permit the lineman to press the latch 26 toward the shank 12 of hook 10, so that the latch may be opened. In this form of safety hook pins 76 and 78 carried by the shank 12 and latch 26, respectively, position the spring 34 which urges the latch 26 away from shank 12. In order that there may be no catching of the projections 70 in the recesses 74 of slide 44 when the slide and latch are simultaneously released from the grip of the lineman's fingers, the surfaces 80 of the slide and 82 of the projections 70 which engage one another may be slightly cammed to assist the spring 34 in urging the latch 26 away from shank 12.

I claim:

1. In a device of the class described, a body member comprising a hook, a spring loaded latch for the hook pivoted on the body member, the body member having a transverse bore in substantially the plane of the hook and in register with the latch, a blocking pin guided in said bore and abutting the latch, a slide mounted by a pin-and-slot connection on the body for limiting sliding motion endwise thereof, said slide covering the blocking pin and having an outwardly projecting portion serving as a finger hold and providing an internal recess into which said pin may be projected when the recess is brought into register with the pin, said slide having a blocking portion which is adapted to be moved over the blocking pin to block outward movement of the same, and a spring covered by said slide for urging the slide in a direction to move the blocking portion over the pin to prevent opening of the latch, said latch having wings at its sides protecting the pin from a ring engaged by the hook.

2. The device of claim 1 wherein the slide is channel shaped in cross section and embraces the back and sides of the body member, the wings of the spring latch embracing the sides of the body portion and the edges of the slide having notches into which said wings are projected when the slide uncovers the pin and the latch is depressed.

3. The device of claim 1 wherein the end of the pin has a head bearing against the latch between the said wings thereof, and there is a spring surrounding the pin and pressing the head of the pin against the latch to urge the latch to move to closed position and the pin to move out of the recess in the slide.

ALBERT N. THOMPSON.

REFERENCES CITED

The following references are of record in the file of this patent:

UNITED STATES PATENTS

| Number | Name | Date |
|---|---|---|
| 424,637 | Anderson | Apr. 1, 1890 |
| 1,025,666 | Yeagle | May 7, 1912 |
| 1,711,667 | Barber et al. | May 7, 1929 |
| 2,116,880 | Dee | May 10, 1938 |
| 2,271,335 | Geiger | Jan. 27, 1942 |

FOREIGN PATENTS

| Number | Country | Date |
|---|---|---|
| 337,973 | France | May 6, 1904 |